United States Patent [19]

Denkewicz, Jr. et al.

[11] Patent Number: 5,739,098
[45] Date of Patent: Apr. 14, 1998

[54] CRYSTALLINE SODIUM POTASSIUM SILICATES

[75] Inventors: Raymond P. Denkewicz, Jr., LaGrange; Eric von Rehren Borgstedt, Louisville, both of Ky.

[73] Assignee: PQ Corporation, Valley Forge, Pa.

[21] Appl. No.: 270,489

[22] Filed: Jul. 5, 1994

[51] Int. Cl.$^6$ .............................. C11D 3/08; C01B 33/32
[52] U.S. Cl. ...................... 510/511; 510/108; 510/507; 510/531; 510/532; 423/332; 423/333; 423/334; 106/600; 106/604
[58] Field of Search ...................... 252/135, 174.25; 423/334, 333, 332; 510/511, 507, 531, 532, 108; 106/600, 604

[56] References Cited

U.S. PATENT DOCUMENTS

| | | | |
|---|---|---|---|
| 2,640,756 | 6/1953 | Wills | 23/111 |
| 3,709,837 | 1/1973 | Weldes | 252/527 |
| 3,918,921 | 11/1975 | Pierce | 23/313 AS |
| 3,960,532 | 6/1976 | Lazet | 65/22 |
| 3,985,669 | 10/1976 | Krummel et al. | 252/116 |
| 4,180,485 | 12/1979 | Llenado | 252/532 |
| 4,276,205 | 6/1981 | Ferry | 252/528 |
| 4,317,779 | 3/1982 | Crawford | 260/400 |
| 4,585,642 | 4/1986 | Rieck | 423/333 |
| 4,664,839 | 5/1987 | Rieck | 252/175 |
| 4,806,327 | 2/1989 | Rieck et al. | 423/332 |
| 4,820,439 | 4/1989 | Rieck | 252/135 |
| 4,950,310 | 8/1990 | Rieck et al. | 34/295 R |
| 4,959,170 | 9/1990 | Ulrich et al. | 252/135 |
| 5,183,651 | 2/1993 | Schimmel et al. | 423/334 |
| 5,211,930 | 5/1993 | Schimmel et al. | 423/333 |
| 5,236,682 | 8/1993 | Schimmel et al. | 423/334 |
| 5,268,156 | 12/1993 | Schimmel et al. | 423/334 |
| 5,344,633 | 9/1994 | Sörensson et al. | 423/333 |

FOREIGN PATENT DOCUMENTS

| | | |
|---|---|---|
| 0 578 986 | 1/1994 | European Pat. Off. . |

OTHER PUBLICATIONS

McCulloch, L., "A New Highly Silicious Soda–Silica Compound", *J. Am. Chem. Soc.* vol. 74, pp. 2453–2456, May 1952.

Johan and Maglione, "La Kanemite, nouveau silicate de sodium hydrate de neoformation", *Bull. Soc. Fr. Mineral. Crystallogr.*, 95, 371 (1972).

"Hydrated Crystalline Alkali Metal Polysilicates", *The Chemistry of Silica*, pp. 158–171, 1979.

R.K. Iler, "Ion Exchange Properties of a Crystalline Hydrated Silica", *J. Colloid Sci.*, 19, pp. 648–657 (1964).

Beneke et al., "Kanemite–innercrystalline reactivity and relations to other sodium silicates", American Mineralogist, vol. 62, pp. 763–771 (1977).

J. Williamson et al., "The crystallisation of $Na_2O.2SiO_2$ glasses", *Physics and Chemistry of Glasses*, vol. 7, No. 4, (Aug. 1966).

*Primary Examiner*—Douglas J. McGinty
*Assistant Examiner*—Lorna M. Douyon
*Attorney, Agent, or Firm*—Ratner & Prestia

[57] ABSTRACT

A crystalline silicate material containing both sodium and potassium cations within the crystalline matrix. Wherein the material is $SiO_2/(xNa_2O+yK_2O)=Z$ where $x+y=1$, $0.75<x<1.0$ (and therefore $0.0<y<0.25$), and $1.3 \leq Z \leq 3.22$. The material possesses predetermined superior hardness ion sequestration properties determined by the composition and processing of the material. The material can be made by any one of several processes which are also set forth.

20 Claims, No Drawings

CRYSTALLINE SODIUM POTASSIUM SILICATES

FIELD OF THE INVENTION

This invention relates to crystalline alkali silicates that exhibit the ability to reduce the activity of hardness ions in laundry wash water, as well as to supply alkalinity and buffer the laundry wash water. In particular, this invention relates to crystalline sodium/potassium silicate materials useful as detergent ingredients.

BACKGROUND OF THE INVENTION

It is known that hard water ions, specifically calcium and magnesium, adversely affect the activity of soaps and detergents. These ions deactivate detergents and can form undesirable precipitates. Thus it is desirable to remove these ions prior to reaction with the detergent. One way to do this is to soften the water prior to introduction into a washing machine. In many parts of the world, this is impractical or impossible, but in most parts of the world it is expensive. Another approach to remove hard water ions is by reaction with another material in situ in the washer. Materials useful for removing hard water ions include alkali silicates (non-crystalline silicates, crystalline silicates and crystalline alumino silicates), particularly hydrated layered alkali silicates.

Layered silicates are materials chemically comprising $SiO_2$ organized into layers (sheets) having a negative charge, with alkali cations for charge compensation. Layered sodium silicates have been known for a number of years, either synthetically produced or naturally occurring (McCulloch J. Am. Chem. Soc. 75, 2453 (1952)). In recent years the use of crystalline layered sodium silicates, especially crystalline sodium disilicates, as detergent builders has been suggested (see U.S. Pat. Nos. 4,585,642; 4,806,327; 4,950,310; 4,820,439; 4,664,839; and 4,959,170). While these patents claim that crystalline sodium disilicates function when incorporated into detergents, the disclosed crystalline layered sodium silicates have not been accepted readily by the worldwide detergent industry due to their poor ability to remove hardness ions from wash water at temperatures below about 30° C.

Furthermore, there are circumstances where it may be necessary or desirable to remove only one hardness ion or the other ($Ca^{2+}$ or $Mg^{2+}$). Some detergent formulations have been developed which work synergistically with one hardness ion. Accordingly, it may be undesirable to remove that ion, or it may be desirable to reduce it to a particular concentration to optimize detergent performance while removing the other ion. Finally, where only one ion is present in the water of a particular geographic region, it is only that ion (either calcium or magnesium) which can be removed from the wash water. In the past, tailoring builder materials to selectively sequester hardness ions was difficult or impossible.

It is an object of this invention to provide a material that is more suitable as a detergent ingredient than previously suggested materials, and which can be made easily and efficiently. It is a further object of this invention to provide the chemistry and the processing necessary to tailor the detergent builder and ion sequestering properties of these crystalline sodium/potassium silicate materials.

SUMMARY OF THE INVENTION

The present invention pertains to a crystalline silicate material containing both sodium and potassium cations within the crystalline matrix. The composition of the material is $SiO_2/(xNa_2O+yK_2O)=Z$ where $x+y=1$, $0.75<x<1.0$ (and therefore $0.0<y<0.25$), and $1.3 \leq Z \leq 3.22$. The material possesses predetermined hardness ion sequestration properties determined by the composition and processing of the material. The material can be made by any one of several processes. The first process route includes the production of an amorphous Na/K silicate glass in a furnace using conventional means. This amorphous glass is then milled and optionally mixed with water. The mixture is calcined to produce the product of the present invention. The calcination is generally performed at temperatures between about 500° C. and 800° C., although calcination temperatures outside this range may be effective with specific formulations. Temperatures outside this range generally yield either an amorphous alkali silicate or undesirable crystalline alkali silicates. The material can then be milled to the appropriate particle size. In the second process, the amorphous Na/K silicate glass is dissolved in soft water and then spray dried to produce a hydrated Na/K silicate, followed by calcination to produce the product of the present invention.

The third process involves the production of a sodium silicate glass by conventional means. This glass is then milled and mixed with water and a suitable potassium compound such as potassium hydroxide. This mixture is calcined to produce the product of the present invention. In each process, product can be recycled into the calciner to seed the formation of the desired product.

The resulting material has a structure unlike prior art alkali silicates, as shown by X-ray diffraction. The different processes, when operated with different ratios of starting materials, produce materials with differing properties and differing abilities to sequester magnesium and calcium ions in solution.

DETAILED DESCRIPTION OF THE INVENTION

The present invention is directed toward the production of crystalline layered silicates having a particular crystal structure effective in the sequestration of hardness ions from solution. The silicates are designed to sequester ions specifically in conjunction with laundry detergents in the laundry wash water. The silicates are alkali oxide silicates including both sodium and potassium oxides.

The sodium/potassium silicates of the present invention have a unique crystal structure, as evidenced by a unique X-ray diffraction pattern. The silicates generally have superior hardness ion sequestration properties as compared to prior art crystalline layered sodium silicates. Furthermores the sodium/potassium silicates of the present invention are cheaper and easier to produce than certain prior art crystalline sodium silicates.

Crystalline sodium silicates and sodium/potassium silicates can be produced having different crystal structures (or phases) for the same chemical composition. The crystal phase of the crystalline silicate depends on the method used to produce it, along with any subsequent treatment. Particularly, sodium disilicates can be produced either the alpha or delta phases. Generally, the delta phase is preferred for detergent formulations due to its increased hardness ion sequestration abilities.

Similarly, the preferred form of sodium/potassium silicate is a crystal phase which was heretofore unknown. That crystal phase has been named DB-1. The presence of this unique phase was determined by X-ray diffraction. The d-spacings of alpha phase sodium disilicate, delta phase sodium disilicate, and DB-1 phase sodium/potassium disilicate as determined by X-ray diffraction will be set forth in conjunction with the examples hereto, specifically in Table 3. The term "disilicate" indicates that the $SiO_2:Na_2O$ ratio (or $SiO_2:(Na_2O+K_2O)$ ratio) is 2.0. Similarly, the term "polysilicate" refers to a polymer of silicon dioxide and alkali oxide in any proportions. Since both alpha and delta phase silicates are crystalline materials, their compositions are fixed. Particularly, alpha, delta, and DB-1 phase silicates are disilicates.

The DB-1 phase crystalline sodium/potassium silicates produced by the present invention are useful as detergent builders due to their hardness ion sequestering properties. The silicates can be used alone as a builder in detergents or in conjunction with other hardness ion sequestering detergent builders as well as other commonly used detergent ingredients (in which case, each is a co-builder). Other detergent builders include anionic, non-ionic and zwiterionic materials. Co-builders such as crystalline alumino silicates, including clays, zeolites, such as Zeolite NaA and Zeolite MAP (maximum aluminum NaP phase), organic sequesterants, and condensed polyphosphates are also compatible with the material of the present invention, as are other conventional detergent ingredients. Zeolites are particularly preferred as co-builders for use with the DB-1 sodium/potassium silicates of the present invention. Spray drying, agglomeration and dry blending methods can be utilized to form stable and efficient detergents containing the products of the present invention.

Conventionally, alpha phase sodium disilicate has been produced by heating a mixture of ground sodium silicate glass and water to about 700° C. to 800° C. However, to produce the desired delta phase, a sodium silicate and water solution must be used as the starting material. The solution is spray dried to produce a hydrous sodium polysilicate. This material is then crushed and calcined at about 700° C. to produce delta phase sodium disilicate. If the starting material for the alpha or delta phase disilicates has a silica:soda ($SiO_2:Na_2O$) ratio other than 2.0, some material will remain in an amorphous state. Similarly, if the starting material for the DB-1 phase disilicate has a silica:alkali oxide ratio other than 2.0, some material will remain in an amorphous state.

The crystalline layered sodium/potassium silicates of the present invention can be produced by any of three processes. The first process is similar to the process for producing the unpreferred alpha phase disilicate. A glass of sodium and potassium silicate is first produced by any conventional means. As used herein, the term "glass" refers to an amorphous silicate. The glass should have a composition of $ZSiO_2:(xNa_2O+yK_2O)$ where $1.3 \leq Z \leq 3.22$, $0.75 < x < 1.0$, and $x+y=1.0$, making $0.0 < y < 0.25$. A preferred composition is 2.0 $SiO_2:(0.90 Na_2O+0.10 K_2O)$.

The glass is cooled and ground. The ground sodium/potassium silicate glass may be mixed with soft water in an amount up to about 25% of the weight of the glass. As referred to herein, the term "soft water" refers to water which is substantially free of hardness ions. Such water may be obtained through distillation, ion exchange, or other standard purification method.

The mixture, or the glass alone, is heated (calcined) to between 500° C. and 800° C., preferably between 700° C. and 770° C. for a sufficient time to form DB-1 phase silicate. Without seeding the mixture, calcination should take place for at least about one hour. This time can be reduced to below fifteen minutes by adding about 10% seed to the mixture before calcination. Generally, the resulting DB-1 phase silicate is milled to produce particles of below 50 microns in size for use in detergent formulations.

Since the addition of seed for calcination is commonly accomplished by recycle of the finished product, such addition reduces the amount of new material in the calciner. This reduces the production rate. However, this is balanced by a shorter residence time in the calciner, which increases production. These two competing effects can be optimized to achieve maximum production rate under the particular process conditions chosen.

The DB-1 material resulting from this process should have a silica:alkali oxide ratio of 2.0. If the silica:alkali oxide ratio of the starting material is anything other than 2.0, the resulting material will include amorphous silicate along with crystalline DB-1 phase silicate. The material used as a seed should have the crystal phase desired to be formed from the starting material. Preferably the seed would also have the same composition as the starting material. Since the seed in the present application is normally taken as recycle from the product stream, the seed may include both crystalline and amorphous material, but should have the same overall composition as the starting material.

The second process for the production of the DB-1 silicates of the present invention is similar to the process for producing delta phase disilicate. A glass of sodium and potassium silicate is first produced by any conventional means. Generally, this is accomplished by introducing pot ash (potassium carbonate), soda ash (sodium carbonate), and sand (silicon dioxide) into a furnace and heating to between 1100° C. and 1300° C. until a uniform fused melt is produced. The proportions of pot ash, soda ash, and sand introduced should be calculated to produce a glass having the composition set forth above.

The glass from the furnace is cooled and dissolved in soft water. The resulting solution is spray dried to produce a hydrous sodium/potassium polysilicate. The concentration of glass in water should therefore be chosen to produce a material which can be easily spray dried. The spray dried hydrous sodium/potassium polysilicate is calcined as set forth by the first process, to produce a DB-1 phase disilicate of the present invention.

The third process for the production of the DB-1 silicates of the present invention has previously been unknown. First, a sodium silicate glass is produced by any conventional method. The glass is milled and mixed with water and a potassium source. Generally, any potassium source such as a potassium halide, potassium nitrate, etc. can be used. However, potassium hydroxide is preferred as the potassium source.

The proportions of sodium silicate glass and potassium hydroxide are selected to produce a mixture having the desired composition of the final product, as set forth above. Since the addition of potassium to the sodium silicate glass adds alkali to the system, if a disilicate material is desired, the starting silica to soda ratio of the sodium silicate glass should be somewhat greater than 2.0. Ten molar KOH solution can be added in an amount up to 25% of the weight of the sodium silicate glass to produce a DB-1 silicate having desirable hardness ion sequestration properties. Once the sodium silicate glass has been mixed with the potassium source and water, the mixture is calcined as set forth above, to produce the DB-1 phase silicate of the present invention.

The following examples illustrate the methods of producing the DB-1 phase sodium/potassium silicates of the present invention. The examples are not intended to limit the scope of the invention in any way, but rather to illustrate the different methods of producing the DB-1 phase silicate of the present invention and the effect of the different methods of production and materials used on the properties of the final product.

EXAMPLES

The proportions for all examples are in parts by weight (pbw), percent weight (%), parts per million (ppm), moles or equivalents unless otherwise indicated. The notation, $DI^2$-water, refers to double distilled water.

The calcium and magnesium ion exchange rates and capacities were determined for various products and are reported as the calcium exchange rate (CER), calcium exchange capacity (CEC), magnesium exchange rate (MgER), and magnesium exchange capacity (MgEC). The results shown in the tables are expressed as milligrams (mg) of $CaCO_3$ per gram (g) of anhydrous product for both calcium and magnesium. For brevity, the calcium and magnesium exchange capacities of the products of this invention, as described in the disclosure and recited in the claims, can also be (and frequently are) expressed in units of milliequivalents of Ca (or Mg) per gram of anhydrous product.

The calcium and magnesium performance (CER, CEC, MgER, and MgEC) were determined as follows. The product (0.5 grams on an anhydrous basis) was reacted with 250 milliliters (ml) of a solution containing either calcium or magnesium ions. The concentration of these solutions was 1000 ppm expressed as $CaCO_3$. The stirred reaction mixture was buffered at a pH of 10 with 2 to 3 ml of a solution of $NH_4Cl$ and $NH_4OH$. The temperature was held at 25° C. unless otherwise noted during the exchange reaction. An aliquot (15 ml) was removed after 2 minutes to determine the calcium and magnesium exchange rates (CER and MgER) by pulling the suspension through a 1.0 micron filter into a syringe. A second aliquot was removed at 15 minutes to determine the calcium and magnesium exchange capacities (CEC and MgEC).

The filtrates from the calcium exchange reaction were analyzed for calcium in solution as follows. A 5 ml aliquot of filtrate was combined with 5 ml of 1 molar NaOH and about 100 milligrams of Hydroxy Naphthol Blue indicator. A titration to a definite blue endpoint was carried out with 0.005 molar ethylene diaminetetracetic acid (EDTA) and the volume of EDTA recorded.

A blank titration using 5 ml of the 1000 ppm $CaCO_3$ solution was carried out using the same method and the volume of EDTA recorded. Filtrates from the magnesium exchange reaction were analyzed in the same manner except that 5 ml of an $NH_4OH/NH_4Cl$ buffer and about 100 mg of Erichrome Black T (3-hydroxy-4-[(1-hydroxy-2-naphthalenyl)azo]-7-nitro-1-naphthalenesulfonic acid monosodium salt, available from Sigma Chemical Co. of St. Louis, Mo.) were used.

The rates and capacities for calcium and magnesium ions removed by the product were calculated as mg of $CaCO_3/g$ of anhydrous product as follows:

$$\frac{\text{milligrams } CACO_3}{\text{gram anhydrous product}} = \frac{(B-V) \cdot M \cdot FW \cdot 50}{[(100 - LOI)/100] \cdot W}$$

where:

B=volume of EDTA for blank titration (ml)

V=volume of EDTA for sample titration (ml)

M=Molarity of EDTA solution

FW=Formula Weight of $CaCO_3$ (100.1 g/mole)

LOI=Loss on ignition of product at 800° C. (%)

W=Weight of product (grams)

Phase identification of the examples was determined using standard x-ray diffraction techniques. A 5–50 two-theta scan was used. To determine precise d-spacings, physical mixtures of a mica standard from the National Bureau of Standards and Testing and products synthesized according to the processes disclosed in this patent were used. Unit cell parameters were determined using a least squares analysis program from the National Bureau of Standards and Testing.

The standard parameters for examples 1–46 are as follows: 20 weight % $DI^2$-water; 80 weight % alkali silicate ground glass wherein the alkali is 90 mole % sodium oxide and 10 mole % potassium oxide and the silica:alkali oxide molar ratio is 2.0; calcined at 700° C. for 1 hour with no seed. For experimental purposes, each parameter was varied while keeping the others constant to determine the effect of a change in any single parameter. Headings for each set of experiments indicate which parameters were varied for that set of experiments, as do the headings for tables. All unspecified parameters for each set of examples have the values set forth above.

Examples 1–4

No water, varying proportions of sodium and potassium.

Preparation of DB-1 silicates according to the process of the present invention began with the preparation of an amorphous sodium/potassium silicate glass. The glass had a composition of $ZSiO_2:(xNa_2O+yK_2O)$ where $Z=2.0$, $1>x>0.75$, and $x+y=1$, (and therefore, $0<y<0.25$). Specifically, the following compositions were made: $2SiO_2:Na_2O$ (comparative example), $2SiO_2:(0.95\ Na_2O+0.05\ K_2O)$, $2SiO_2:(0.90\ Na_2O+0.10\ K_2O)$, and $2SiO_2:(0.80\ Na_2O+0.20\ K_2O)$. Material having the composition $2SiO_2:(0.75\ Na_2O+0.25\ K_2O)$ was also made, but was not tested. It was therefore excluded from Table 1.

The glass was formed by the fusion of a sodium carbonate, potassium carbonate, and silica at between 1100° C. to 1300° C. followed by rapid cooling of the molten sodium/potassium glass in an ice bath. The cool amorphous sodium/potassium glass was ball milled to produce particles of less than 200 microns.

The ground amorphous sodium/potassium glass was heated to 700° C. at a heating rate of 5° C./minute and held at this temperature for 1 hour. The resulting product was ball milled to produce particles of less than 50 micron diameter. The crystalline silicate phases present in the products as identified by x-ray diffraction is shown in Table 1. The hardness ion binding performance results for the crystalline sodium/potassium silicates are also shown in Table 1. As can be seen from Table 1, the DB-1 crystalline silicate is preferentially produced as the proportion of potassium increases in the amorphous sodium/potassium glass.

In Table 1, as well as all other tables herein, where x-ray analysis indicates that more than one crystalline phase is presents the predominant phase is listed first. Thus "alpha & DB-1" indicates that alpha phase disilicate predominates, whereas "DB-1 & alpha" indicates that the DB-1 phase predominates.

TABLE 1

Crystalline products from silicate having varying proportions of potassium and sodium, with no water

| Example No. | $SiO_2/(xNa_2O + yK_2O) = 2.0$ | CER | CEC | MgER | MgEC | X-ray Analysis |
|---|---|---|---|---|---|---|
| 1 | x = 1 and y = 0 | 99 | 138 | 171 | 196 | Alpha |
| 2 | x = 0.95 and y = 0.05 | 100 | 125 | 200 | 274 | Alpha & DB-1 |
| 3 | x = 0.90 and y = 0.10 | 64 | 221 | 296 | 325 | DB-1 |
| 4 | x = 0.80 and y = 0.20 | 104 | 124 | 255 | 279 | DB-1 & Other |

Examples 5a–9

Varying proportions of sodium and potassium.

Preparation of DB-1 silicates according to the process of the present invention began with the preparation of an amorphous sodium/potassium silicate glass. The glass had a composition of $ZSiO_2:(xNa_2O+yK_2O)$ where Z=2.0, 1>x>0.75, and x+y=1, (and therefore, 0<y<0.25). The glass was formed by the fusion of a sodium carbonate, potassium carbonate, and silica between 1100° C. to 1300° C. followed by rapid cooling of the molten sodium/potassium glass in an ice bath. The cool amorphous sodium/potassium glass was ball milled to produce particles of less than 200 microns.

A mixture of 8 pbw of the ground amorphous sodium/potassium glass and 2 pbw of $DI^2$-water was heated to 700° C. at a heating rate of 5° C./minute and held at this temperature for 1 hour. The resulting material was cooled and ball milled to produce particles of less than 50 microns diameter.

results for DB-1 silicates are shown in Table 2. As the concentration of potassium increases, the DB-1 silicate is observed to be preferentially synthesized from the amorphous sodium/potassium glass/water mixture.

A highly crystalline DB-1 silicate was produced by heating amorphous sodium/potassium glass having a $SiO_2/(0.9Na_2O+0.1K_2O)=2$ mole ratio composition at 700° C., as shown in example 3. The crystallization of a DB-1 silicate from an amorphous sodium/potassium glass and water mixture at 700° C., as shown in example 7, had superior hardness ion binding properties when compared to the DB-1 silicate crystallized from an amorphous sodium/potassium glass at 700° C. shown in example 3. The CER and CEC improved by 275% and 29%, respectively, and the MgER and MgEC improved by 11% and 25%, respectively.

TABLE 2

Crystalline products from silicate having varying proportions of potassium and sodium

| Example No. | $SiO_2/(xNa_2O + yK_2O) = 2.0$ | CER | CEC | MgER | MgEC | X-ray Analysis |
|---|---|---|---|---|---|---|
| 5a | x = 1 and y = 0 | 55 | 103 | 111 | 184 | Alpha |
| 5d | x = 1 and y = 0 | 105 | 270 | 110 | 300 | Delta |
| 6 | x = 0.95 and y = 0.05 | 209 | 239 | 326 | 400 | DB-1 & Alpha |
| 7 | x = 0.90 and y = 0.10 | 240 | 285 | 330 | 405 | DB-1 |
| 8 | x = 0.80 and y = 0.20 | 187 | 247 | 283 | 357 | DB-1 |
| 9 | x = 0.75 and y = 0.25 | 72 | 97 | 270 | 369 | Phase Unknown |

The crystalline sodium/potassium silicate phases present in the products as identified by x-ray diffraction are shown in Table 2. The d-spacings for crystalline materials are shown in Table 3. Example 5a is alpha phase sodium disilicate and was produced according to the process set forth above. Example 7 is DB-1 phase sodium/potassium disilicate.

Example 5d is delta-phase sodium disilicate and was produced according to the following process. A spray dried sodium silicate having 2 moles of $SiO_2$ for each mole of $Na_2O$ and 18% water was heated to 700° C. for 1 hour. The crystalline mass was pulverized by ball milling. The product was identified by X-ray diffraction as delta-phase sodium disilicate.

The unit cell parameters of the various crystalline silicates, examples 5a–9, as determined by x-ray diffraction are shown in Table 4. The hardness ion binding performance

TABLE 3 d-spacings of examples 5a, 5d, and 7 [$SiO_2/(xNa_2O + yK_2O) = 2$]

| Example 5d x = 1 and y = 0 | | Example 7 x = 0.90 and y = 0.10 | | Example 5a x = 1 and y = 0 | |
|---|---|---|---|---|---|
| d-spacing (Å) | Phase | d-spacing (Å) | Phase | d-spacing (Å) | Phase |
| 6.9104 | Delta | 6.9429 | DB-1 | 4.93 | Alpha |
| 6.0623 | Delta | 6.0315 | DB-1 | 3.89 | Alpha |
| 4.9106 | Delta | 4.9072 | DB-1 | 3.86 | Alpha |
| 4.2007 | Delta | 4.2037 | DB-1 | 3.77 | Alpha |
| 3.9658 | Delta | 3.9878 | DB-1 | 3.47 | Alpha |
| 3.7878 | Delta | 3.7906 | DB-1 | 3.30 | Alpha |
| 3.637 | Delta | 3.6268 | DB-1 | 3.20 | Alpha |
| 3.4481 | Delta | 3.4603 | DB-1 | 3.10 | Alpha |
| 3.1003 | Delta | 3.8964 | DB-1 | 2.959 | Alpha |
| 2.9097 | Delta | 2.9097 | DB-1 | 2.139 | Alpha |

TABLE 3-continued d-spacings of examples 5a, 5d, and 7 [SiO$_2$/(xNa$_2$O + yK$_2$O) = 2]

| Example 5d x = 1 and y = 0 | | Example 7 x = 0.90 and y = 0.10 | | Example 5a x = 1 and y = 0 | |
|---|---|---|---|---|---|
| d-spacing (Å) | Phase | d-spacing (Å) | Phase | d-spacing (Å) | Phase |
| 2.723 | Delta | 2.7637 | DB-1 | 2.642 | Alpha |
| 2.5666 | Delta | 2.5673 | DB-1 | 2.533 | Alpha |
| 2.4978 | Delta | 2.5000 | DB-1 | 2.464 | Alpha |
| 2.4259 | Delta | 2.4227 | DB-1 | 2.448 | Alpha |

TABLE 4

Unit cell parameters for example 5–9

| Example No. | Phase | SiO$_2$/(xNa$_2$O + yK$_2$O) = 2.0 | "a" (Å) | "b" (Å) | "c" (Å) | volume (Å$^3$) |
|---|---|---|---|---|---|---|
| 5a | Alpha | x = 1 and y = 0 | 6.4090 | 15.4230 | 4.8960 | 483.95 |
| 5d | Delta | x = 1 and y = 0 | 12.0700 | 8.3700 | 4.8400 | 488.96 |
| 6 | DB-1 | x = 0.95 and y = 0.05 | 12.0710 | 8.3913 | 4.8509 | 491.35 |
| 7 | DB-1 | x = 0.90 and y = 0.10 | 12.0926 | 8.4076 | 4.8612 | 494.23 |
| 8 | DB-1 | x = 0.80 and y = 0.20 | 12.0978 | 8.4210 | 4.8628 | 495.40 |
| 9 | DB-1 | x = 0.75 and y = 0.25 | — | — | — | — |

The crystalline sodium/potassium silicate phases present in the products as identified by x-ray diffraction are shown in Table 5. Table 5 also shows the hardness ion binding performance results for these DB-1 silicates including the DB-1 silicate produced in example 7. The material from example 7 had the highest hardness ion binding performances based on calcium ion binding. The unit cell parameters of these various DB-1 silicates, examples 7 and 10–12, as determined by x-ray diffraction are shown in Table 6.

TABLE 5

Crystalline products from silicate having varying ratios of silica to alkali oxide

| Example No. | SiO$_2$/(0.9Na$_2$O + 0.1K$_2$O) = Z | CER | CEC | MgER | MgEC | X-ray Analysis |
|---|---|---|---|---|---|---|
| 10 | Z = 1.7 | 172 | 249 | 408 | 445 | DB-1 + Am. |
| 7 | Z = 2.0 | 240 | 285 | 330 | 405 | DB-1 |
| 11 | Z = 2.4 | 199 | 255 | 218 | 314 | DB-1 + Am. |
| 12 | Z = 3.22 | 60 | 150 | 155 | 251 | DB-1 + Am. |

Am. denotes amorphous material

Examples 10–12

Varying silicate to alkali oxide ratios.

Preparation of DB-1 silicates according to the process of the present invention began with the preparation of an amorphous sodium/potassium silicate glass. The glass had a composition of ZSiO$_2$:(xNa$_2$O+yK$_2$O) where 1.7≧Z≧3.22, x=0.90, and x+y=1, (and therefore, y=0.10). The glass was formed by the fusion of a sodium carbonate, potassium carbonate, and silica between 1100° C. to 1300° C. followed by rapid cooling of the molten sodium/potassium glass in an ice bath. The cool amorphous sodium/potassium glass was ball milled to produce particles of less than 200 microns.

A mixture of 8 pbw of the ground amorphous sodium/potassium glass and 2 pbw of Di$^2$-water was heated to 700° C. at a heating rate of 5° C./minute and held at this temperature for 1 hour. The resulting material was cooled and ball milled to produce particles of less than 50 microns diameter.

TABLE 6

Unit cell parameters for examples 5, 7, and 10–12

| Example No. | SiO$_2$(0.9Na$_2$O + 0.10K$_2$O) = Z | "a" (Å) | "b" (Å) | "c" (Å) | volume (Å$^3$) |
|---|---|---|---|---|---|
| 10 | Z = 1.7 | 12.0173 | 8.4833 | 4.8692 | 496.4 |
| 7 | Z = 2.0 | 12.0226 | 8.4076 | 4.8612 | 491.38 |
| 11 | Z = 2.4 | 12.0627 | 8.4085 | 4.8421 | 491.14 |
| 12 | Z = 3.22 | 12.0745 | 8.4140 | 4.8533 | 493.07 |
| 5a | Delta Disilicate (SiO$_2$/Na$_2$O = 2) | 12.0700 | 8.3700 | 4.8400 | 488.96 |
| 5d | Alpha Disilicate (SiO$_2$/Na$_2$O = 2) | 6.4090 | 15.4230 | 4.8960 | 483.95 |

Examples 13–21

Varying proportions of sodium and potassium and varying calcination temperatures.

Preparation of DB-1 silicates according to the process of the present invention began with the preparation of an amorphous sodium/potassium silicate glass. The glass had a composition of $ZSiO_2:(xNa_2O+yK_2O)$ where $Z=2.0$, $1>x \geq 0.80$, and $x+y=1$, (and therefore, $0<y \leq 0.20$). The glass was formed by the fusion of a sodium carbonate, potassium carbonate, and silica between 1100° C. to 1300° C. followed by rapid cooling of the molten sodium/potassium glass in an ice bath. The cool amorphous sodium/potassium glass was ball milled to produce particles of less than 200 microns.

A mixture of 8 pbw of the ground amorphous sodium/potassium glass and 2 pbw of $DI^2$-water was heated to a temperature between 500° C. and 800° C., as set forth in Table 7, at a heating rate of 5° C./minute and held at this temperature for 1 hour. The resulting material was cooled and ball milled to produce particles of less than 50 microns diameter.

The crystalline sodium/potassium silicate phases present in the products as identified by x-ray diffraction are shown in Table 7. The hardness ion binding performance results for the DB-1 silicates are also shown in Table 7. Generally, DB-1 silicates prepared at 700° C., examples 7 and 8, were considered to be very crystalline and these products exhibited the highest hardness ion binding performances. The DB-1 phase sodium/potassium crystalline silicates have considerably higher affinity to bind calcium and magnesium ions in solution when compared to pure sodium crystalline silicates. This was concluded by comparing examples 5a and 15 which are the pure alpha phase sodium crystalline silicates to examples 7, 8, and 18 which are the pure sodium/potassium crystalline silicates.

Examples 22–36

Varying proportions of sodium and potassium and varying calcination times.

Preparation of DB-1 silicates according to the process of the present invention began with the preparation of an amorphous sodium/potassium silicate glass. The glass had a composition of $ZSiO_2:(xNa_2O+yK_2O)$ where $Z=2.0$, $X=1.0$, 0.90, and 0.80, and $x+y=1.0$, (and therefore, $Y=0.20$, 0.10, and 0.0). The glass was formed by the fusion of a sodium carbonate, potassium carbonate, and silica between 1100° C. to 1300° C. followed by rapid cooling of the molten sodium/potassium glass in an ice bath. The cool amorphous sodium/potassium glass was ball milled to produce particles of less than 200 microns.

A mixture of 8 pbw of the ground amorphous sodium/potassium glass and 2 pbw of $Di^2$-water was heated to 700° C. at a heating rate of 5° C./minute and held at this temperature for a period of time as described in Table 8. The resulting material was cooled and ball milled to produce particles of less than 50 microns diameter.

The crystalline silicate phases present in the products as identified by x-ray diffraction are shown in Table 8. The hardness ion binding performance results for the DB-1 silicates can also be found in Table 8. The results indicate that the crystallization time to synthesize the DB-1 silicate does not significantly affect the hardness ion binding properties, or crystallize more undesirable sodium/potassium silicate phases.

TABLE 7

Crystalline products from silicate having varying proportions of sodium and potassium, calcined at various temperatures

| Example No. | $SiO_2/(xNa_2O + yK_2O) = 2.0$ | Temperature | CER | CEC | MgER | MgEC | X-ray Analysis |
|---|---|---|---|---|---|---|---|
| 13 | x = 1 and y = 0 | 500° C. | 40 | 65 | 85 | 169 | Am. + Alpha |
| 14 | x = 1 and y = 0 | 600° C. | 45 | 100 | 110 | 175 | Am. + Alpha |
| 5a | x = 1 and y = 0 | 700° C. | 55 | 103 | 111 | 184 | Alpha |
| 15 | x = 1 and y = 0 | 800° C. | 45 | 102 | 117 | 191 | Alpha |
| 16 | x = 0.90 and y = 0.10 | 500° C. | 135 | 204 | 225 | 324 | Am. + DB-1 |
| 17 | x = 0.90 and y = 0.10 | 600° C. | 221 | 239 | 346 | 423 | DB-1 + Am. |
| 7 | x = 0.90 and y = 0.10 | 700° C. | 240 | 285 | 330 | 405 | DB-1 |
| 18 | x = 0.90 and y = 0.10 | 800° C. | 236 | 281 | 312 | 281 | DB-1 |
| 19 | x = 0.80 and y = 0.20 | 500° C. | 96 | 157 | 184 | 304 | Am. + DB-1 |
| 20 | x = 0.80 and y = 0.20 | 600° C. | 198 | 248 | 226 | 320 | DB-1 + Am. |
| 8 | x = 0.80 and y = 0.20 | 700° C. | 187 | 247 | 283 | 357 | DB-1 |
| 21 | x = 0.80 and y = 0.20 | 800° C. | 35 | 50 | 155 | 314 | Am. + DB-1 |

TABLE 8

Crystalline products from silicate having varying proportions of sodium and potassium, calcined for varying time periods.

| Example No. | $SiO_2/(xNa_2O + yK_2O) = 2.0$ | Time (hours) | CER | CEC | MgER | MgEC | X-ray Analysis |
|---|---|---|---|---|---|---|---|
| 5a | x = 1 and y = 0 | 1 | 55 | 103 | 111 | 184 | Alpha |
| 22 | x = 1 and y = 0 | 3 | 60 | 111 | 118 | 191 | Alpha |
| 23 | x = 1 and y = 0 | 6 | 45 | 114 | 117 | 188 | Alpha |
| 24 | x = 1 and y = 0 | 12 | 35 | 119 | 116 | 180 | Alpha |
| 25 | x = 1 and y = 0 | 18 | 40 | 116 | 117 | 174 | Alpha |
| 26 | x = 1 and y = 0 | 24 | 36 | 110 | 111 | 170 | Alpha |
| 7 | x = 0.90 and y = 0.10 | 1 | 240 | 285 | 330 | 405 | DB-1 |

TABLE 8-continued

Crystalline products from silicate having varying proportions of sodium and potassium, calcined for varying time periods.

| Example No. | $SiO_2/(xNa_2O + yK_2O) = 2.0$ | Time (hours) | CER | CEC | MgER | MgEC | X-ray Analysis |
|---|---|---|---|---|---|---|---|
| 27 | x = 0.90 and y = 0.10 | 3 | 245 | 290 | 330 | 395 | DB-1 |
| 28 | x = 0.90 and y = 0.10 | 6 | 251 | 288 | 334 | 401 | DB-1 |
| 29 | x = 0.90 and y = 0.10 | 12 | 230 | 286 | 326 | 400 | DB-1 |
| 30 | x = 0.90 and y = 0.10 | 18 | 230 | 280 | 346 | 436 | DB-1 |
| 31 | x = 0.90 and y = 0.10 | 24 | 220 | 278 | 355 | 440 | DB-1 |
| 8  | x = 0.80 and y = 0.20 | 1 | 187 | 247 | 283 | 357 | DB-1 |
| 32 | x = 0.80 and y = 0.20 | 3 | 145 | 185 | 225 | 310 | DB-1 |
| 33 | x = 0.80 and y = 0.20 | 6 | 140 | 175 | 220 | 300 | DB-1 |
| 34 | x = 0.80 and y = 0.20 | 12 | 135 | 155 | 219 | 304 | DB-1 |
| 35 | x = 0.80 and y = 0.20 | 18 | 125 | 245 | 207 | 284 | DB-1 + Am. |
| 36 | x = 0.80 and y = 0.20 | 24 | 120 | 210 | 200 | 290 | DB-1 + Am. |

Am = Amorphous

Examples 37–39

Varying amounts of seed, no water.

Preparation of DB-1 silicates according to the process of the present invention began with the preparation of an amorphous sodium/potassium silicate glass. The glass had a composition of $ZSiO_2:(xNa_2O+yK_2O)$ where Z=2.0, x=0.90, and x+y=1, (and therefore, y=0.10). The glass was formed by the fusion of a sodium carbonate, potassium carbonate, and silica between 1100° C. to 1300° C. followed by rapid cooling of the molten sodium/potassium glass in an ice bath. The cool amorphous sodium/potassium glass was ball milled to produce particles of less than 200 microns.

A mixture of ground amorphous sodium/potassium glass and DB-1 silicate seed having a mole composition identical to that of the amorphous sodium/potassium glass, was heated to 700° C. at a heating rate of 5° C./minute and held at this temperature for 1 hour. The amount of seed added is shown in Table 9. The resulting material was cooled and ball milled to produce particles of less than 50 microns diameter.

A DB-1 silicate phase was identified by x-ray diffraction. The hardness ion binding performance results for the DB-1 silicates are shown in Table 9. Crystallization of the amorphous sodium/potassium glass in the presence of a DB-1 silicate seed increased the hardness ion binding performance compared to crystallization with no seed. Comparing example 3 (no seed) to example 39 (10% seed), it may be seen that the addition of 10% seed during calcination increased the CER and CEC by 252% and 20%, respectively, and increased the MgER and MgEC by 24% and 30%, respectively.

TABLE 9

Crystalline products from silicate with no water and having various amounts of seed

| Example No. | Seed (weight %) | CER | CEC | MgER | MgEC | X-Ray Analysis |
|---|---|---|---|---|---|---|
| 3  | 0  | 64  | 221 | 296 | 325 | DB-1 |
| 37 | 1  | 215 | 250 | 372 | 432 | DB-1 |
| 38 | 5  | 215 | 255 | 372 | 417 | DB-1 |
| 39 | 10 | 225 | 265 | 367 | 422 | DB-1 |

Example 40–42

Varying amounts of seed.

Preparation of DB-1 silicates according to the process of the present invention began with the preparation of an amorphous sodium/potassium silicate glass. The glass had a composition of $ZSiO_2:(xNa_2O+yK_2O)$ where Z=2.0, x=0.90, and x+y=1, (and therefore, y=0.10). The glass was formed by the fusion of a sodium carbonate, potassium carbonate, and silica between 1100° C. to 1300° C. followed by rapid cooling of the molten sodium/potassium glass in an ice bath. The cool amorphous sodium/potassium glass was ball milled to produce particles of less than 200 microns.

A mixture of 8 pbw of the ground amorphous sodium/potassium glass, 2 pbw of $DI^2$-water, and a DB-1 silicate seed having a mole composition identical to that of the amorphous sodium/potassium glass, was heated to 700° C. at a heating rate of 5° C./minute and held at this temperature for 1 hour. The amount of seed added is shown in Table 10. The resulting material was cooled and ball milled to produce particles of less than 50 microns diameter.

A DB-1 silicate phase was identified by x-ray diffraction. The hardness ion binding performance results for the DB-1 silicates are shown in Table 10. The use of DB-1 seed during calcination of the amorphous sodium/potassium glass and water mixture appeared to have negligible effect on the hardness ion binding properties of the resulting material.

TABLE 10

Crystalline products from silicate having varying amounts of seed.

| Example No. | Seed (weight %) | CER | CEC | MgER | MgEC | X-Ray Analysis |
|---|---|---|---|---|---|---|
| 7  | 0  | 240 | 285 | 330 | 405 | DB-1 |
| 40 | 1  | 245 | 280 | 363 | 403 | DB-1 |
| 41 | 5  | 235 | 285 | 352 | 427 | DB-1 |
| 42 | 10 | 235 | 285 | 352 | 407 | DB-1 |

Examples 43–46

Varying calcination times in the presence of 10 weight % seed.

Preparation of DB-1 silicates according to the process of the present invention began with the preparation of an amorphous sodium/potassium silicate glass. The glass had a composition of $ZSiO_2:(xNa_2O+yK_2O)$ where Z=2.0, x=0.90, and x+y=1, (and therefore, y=0.10). The glass was formed by the fusion of a sodium carbonate, potassium carbonate, and silica between 1100° C. to 1300° C. followed by rapid cooling of the molten sodium/potassium glass in an ice bath. The cool amorphous sodium/potassium glass was ball milled to produce particles of less than 200 microns.

A mixture of 8 pbw of ground amorphous sodium/potassium glass, 2 pbw of DI$^2$-water, and 10 weight percent of DB-1 silicate seed having a mole composition identical to that of the amorphous sodium/potassium glass was heated to 700° C. at a heating rate of 5° C./minute and held at this temperature for a period of time as described in Table 11. The resulting material was cooled and ball milled to produce particles of less than 50 microns diameter.

A DB-1 silicate phase was identified by x-ray diffraction. The hardness ion binding performance results for DB-1 silicates are shown in Table 11. Excellent hardness ion binding performances were observed when an amorphous sodium/potassium glass was calcined in the presence of 10% DB-1 seed for 15 minutes or more.

No data for calcination times shorter than 15 minutes was collected. Accordingly, shorter times may also result in effective calcination when using seed.

TABLE 11

Crystalline products from silicate with varying calcination times and 10% seed

| Example No. | Time (minutes) | CER | CEC | MgER | MgEC | X-Ray Analysis |
|---|---|---|---|---|---|---|
| 43 | 15 | 205 | 240 | 333 | 393 | DB-1 |
| 44 | 30 | 220 | 265 | 342 | 412 | DB-1 |
| 45 | 45 | 225 | 280 | 353 | 408 | DB-1 |
| 42 | 60 | 235 | 285 | 352 | 427 | DB-1 |
| 46 | 180 | 235 | 285 | 382 | 432 | DB-1 |

SECOND PROCESS

Examples 47 and 48 demonstrate the production of sodium/potassium silicates in accordance with the second process of the present invention. In this process, amorphous Na/K silicate glass is dissolved and spray dried to produce a hydrous sodium/potassium polysilicate. The hydrated silicate is then calcined to produce the product of the present invention.

Example 47

Hydrous polysilicate having 16% to 22% water content, calcined for 3 hours.

Preparation of DB-1 silicates according to the process of the present invention was accomplished by heating an amorphous hydrous sodium/potassium polysilicate having a composition of 2.0 SiO$_2$/(0.90 Na$_2$O+0.10 K$_2$O) and a water content between 16 to 22%. The mixture was heated to 700° C. at a 5° C./minute and held at this temperature for 3 hours. The cool crystalline sodium/potassium silicate was ball milled to produce particles of less than 50 microns.

A DB-1 silcate phase was identified by x-ray diffraction. The hardness ion binding performance results for the crystalline sodium/potassium silicates are shown in Table 12.

Example 48

Liquid sodium/potassium silicate having 60% to 70% water content and no added water, calcined for 3 hours.

Preparation of DB-1 silicates according to the process of the present invention was accomplished by heating an amorphous hydrous sodium/potassium polysilicate having a composition of 2.0 SiO$_2$/(0.90 Na$_2$O+0.10 K$_2$O) and a water content between 60% to 70%. The mixture was heated to 700° C. at a 2° C./minute and held at this temperature for 3 hours. The crystalline sodium/potassium silicate was cooled and ball milled to produce particles of less than 50 microns. A DB-1 phase was identified by x-ray diffraction. The hardness ion binding performance results for the DB-1 silicates are shown in Table 12.

TABLE 12

Crystalline products from silicates having a variable water content, calcined for 3 hours

| Example No. | LOI (wt %) | CER | CEC | MgER | MgEC | X-Ray Analysis |
|---|---|---|---|---|---|---|
| 7 | 0% | 240 | 285 | 330 | 405 | DB-1 |
| 47 | 16–22% | 233 | 290 | 343 | 423 | DB-1 |
| 48 | 60–70% | 235 | 292 | 328 | 416 | DB-1 |

THIRD PROCESS

Examples 49 to 75 show the production of the crystalline silicate material of the present invention by the third process of the present invention. In the third process, conventional sodium silicate glass is milled and mixed with a potassium source, such as potassium hydroxide, and water. Other potassium sources (such as a potassium halide or potassium peroxide) may also be used. The mixture is then calcined to produce the crystalline product of the present invention.

Comparative Examples 49–56

Preparation of sodium silicate by treatment of silicate with NaOH, no potassium present.

Preparation of a crystalline sodium silicate was accomplished by heating a mixture of a ground glass having a SiO$_2$/Na$_2$O mole ratio of 2.0 with 10 molar NaOH solution and DI$^2$-water in various weight ratios as set forth in Table 13. The mixture was heated to 700° C. at a heating rate of 5° C./minute and held at this temperature for 1 hour. The cooled crystalline sodium silicate was ball milled to produce particles of less than 50 microns.

The crystalline sodium silicate phases present in the products as identified by x-ray diffraction are shown in Table 13. The hardness ion binding performance results for the crystalline sodium silicates are also shown in Table 13. Decreasing the SiO$_2$/Na$_2$O ratio of the ground amorphous sodium silicate glass by the addition of NaOH to the ground glass had a negligible effect in preferentially synthesizing the delta phase crystalline silicate instead of the alpha phase sodium crystalline silicate.

TABLE 13

Comparative examples of crystalline products from silicate treated with varying amounts of 10M NaOH and DI²-water and calcined.

| Example No. | Ground Glass, SiO₂/Na₂O = 2.0 (grams) | 10M NaOH (grams) | DI²-water (grams) | CER | CEC | MgER | MgEC | X-ray Analysis |
|---|---|---|---|---|---|---|---|---|
| 49 | 80 | 5 | 15 | 70 | 115 | 339 | 429 | Alpha |
| 50 | 80 | 7 | 13 | 75 | 125 | 395 | 435 | Alpha |
| 51 | 80 | 9 | 11 | 95 | 145 | 395 | 435 | Alpha + Delta |
| 52 | 80 | 11 | 9 | 105 | 160 | 384 | 444 | Alpha + Delta |
| 53 | 80 | 13 | 7 | 110 | 165 | 400 | 425 | Alpha + Delta |
| 54 | 80 | 15 | 5 | 130 | 190 | 410 | 455 | Alpha + Delta |
| 55 | 80 | 17 | 3 | 130 | 195 | 391 | 461 | Alpha + Delta |
| 56 | 80 | 20 | 0 | 145 | 215 | 390 | 475 | Alpha + Delta |

Example 57–68

Varying ratios of 10M KOH and water.

Preparation of DB-1 silicates according to the process of the present invention was accomplished by heating a mixture of a ground glass having a SiO₂/Na₂O mole ratio of 2.0 with 10 molar KOH solution and DI²-water in various weight ratios as described in Table 14. The mixture was heated to 700° C. at a rate of 5° C./minute and held at this temperature for 1 hour. The cooled crystalline sodium/potassium silicate was ball milled to produce particles of less than 50 microns.

The crystalline silicate phases present in the products as identified by x-ray diffraction are shown in Table 14. The hardness ion binding performance results for the DB-1 silicates are also shown in Table 14. The unit cell parameters for the DB-1 silicates shown in Table 14 are consistent with example 3. The presence of potassium during the crystallization of the amorphous sodium silicate/water mixture resulted in alpha phase and/or DB-1 phase silicates to be crystallized. As the potassium concentration increased, the desired DB-1 phase crystalline silicates were preferentially produced.

Even adding as much as 20 grams 10M KOH resulted in the formation of DB-1 phase silicate. At 20 grams 10M KOH, the SiO₂:(Na₂O+K₂O) ratio will change significantly from the initial 2.0 value. The initial 80 grams 2.0 SiO₂:Na₂O should have about 0.44 moles Na₂O and 0.88 moles SiO₂. The addition of 20 grams of 10M KOH should add 0.20 moles K₂O making a total of 0.64 moles alkali oxide. The SiO₂:(Na₂O+yK₂O) ratio then becomes 0.88:0.64 or 1.375. Thus even SiO₂:(Na₂O+yK₂O) ratios as low as 1.375 yield DB-1 phase silicate.

TABLE 14

Crystalline products from mixtures with varying proportions of sodium silicate, potassium hydroxide, and water

| Example No. | Ground Glass, SiO₂/Na₂O = 2.0 (grams) | 10M NaOH (grams) | DI²-water (grams) | CER | CEC | MgER | MgEC | X-ray Analysis |
|---|---|---|---|---|---|---|---|---|
| 57 | 80 | 0 | 20 | 89 | 129 | 208 | 273 | Alpha |
| 58 | 80 | 1 | 19 | 100 | 138 | 203 | 278 | Alpha |
| 59 | 80 | 3 | 17 | 118 | 165 | 291 | 360 | Alpha + DB-1 |
| 60 | 80 | 5 | 15 | 115 | 160 | 342 | 427 | DB-1 + Alpha |
| 61 | 80 | 7 | 13 | 180 | 224 | 372 | 422 | DB-1 + Alpha |
| 62 | 80 | 9 | 11 | 249 | 274 | 395 | 440 | DB-1 + Alpha |
| 63 | 80 | 11 | 9 | 255 | 305 | 400 | 440 | DB-1 |
| 64 | 80 | 13 | 7 | 235 | 290 | 393 | 437 | DB-1 |
| 65 | 80 | 15 | 5 | 229 | 289 | 384 | 449 | DB-1 |
| 66 | 80 | 17 | 3 | 235 | 279 | 360 | 440 | DB-1 |
| 67 | 80 | 19 | 1 | 230 | 280 | 349 | 442 | DB-1 |
| 68 | 80 | 20 | 0 | 240 | 285 | 355 | 450 | DB-1 |

Examples 69–72

Varying calcination times

Preparation of DB-1 silicates according to the process of the present invention was accomplished by heating a mixture of 80 weight % of ground glass having a SiO₂/Na₂O mole ratio of 2.0, 11 weight % of 10 molar KOH solution, and 9 weight % of DI²-water. The mixture was heated to 700° C. at a heating rate of 5° C./minute and held at this temperature for a period of time as described in Table 15. The cooled DB-1 silicate was ball milled to produce particles of less than 50 microns.

The crystalline silicate phases present in the products as identified by x-ray diffraction are shown in Table 15. The hardness ion binding performance results for the DB-1 silicates are also shown in Table 15. The results show that the crystallization time of an 80 weight % ground glass/11 weight % KOH/9 weight % DI²-water mixture had negligible effect on the hardness ion binding performance. For long crystallization times, i.e. greater than 6 hours, no additional phases are crystallized, and no decrease in the hardness ion binding properties are observed.

TABLE 15

Crystalline products form mixtures of sodium silicate, potassium hydroxide, and water with various calcination time.

| Example No. | Time (hours) | CER | CEC | MgER | MgEC | X-Ray Analysis |
|---|---|---|---|---|---|---|
| 63 | 1 | 255 | 305 | 400 | 440 | DB-1 |
| 69 | 3 | 245 | 299 | 406 | 426 | DB-1 |
| 70 | 6 | 240 | 290 | 397 | 427 | DB-1 |
| 71 | 9 | 245 | 295 | 395 | 425 | DB-1 |
| 72 | 12 | 230 | 290 | 388 | 433 | DB-1 |

Examples 73-75

Varying calcination temperatures.

Preparation of DB-1 silicates according to the process of the present invention was accomplished by heating a mixture of 80 pbw of ground glass having a $SiO_2/Na_2O$ mole ratio of 2.0, 11 pbw of 10 molar KOH solution, and 9 pbw of $DI^2$-water. The mixture was heated to a temperature between 500° C. and 800° C. as described in Table 16, at a heating rate of 5° C./minute and held at that temperature for 3 hours. The cooled DB-1 silicate was ball milled to produce particles of less than 50 microns.

The crystalline silicate phases present in the products as identified by x-ray diffraction are shown in Table 16. The hardness ion binding performance results for the DB-1 crystalline sodium/potassium silicates are shown in Table 16.

Excellent hardness ion binding performances were obtained when the crystallization temperature was around 700° C.

TABLE 16

Crystalline products from mixtures of sodium silicate, 10M KOH, and $DI^2$-water with varying calcination temperatures

| Example No. | Temperature | CER | CEC | MgER | MgEC | X-Ray Analysis |
|---|---|---|---|---|---|---|
| 73 | 500° C. | 143 | 203 | 359 | 439 | DB-1 + Am. |
| 74 | 600° C. | 157 | 227 | 360 | 445 | DB-1 + Am. |
| 63 | 700° C. | 245 | 299 | 397 | 427 | DB-1 |
| 75 | 800° C. | 201 | 264 | 340 | 431 | DB-1 |

What is claimed:

1. A crystalline phase sodium/potassium silicate produced by the following process:
   producing an anhydrous sodium/potassium glass having a composition of $ZSiO_2:(xNa_2O+yK_2O)$ where $1.7<Z<3.22$, $1>x>0.75$, $0<y<0.25$, and $x+y=1$; and
   calcining said glass at a temperature between about 500° C. and about 800° C. for at least about fifteen minutes in the optional presence of water to produce a crystalline silicate.

2. The crystalline phase sodium/potassium silicate of claim 1 wherein said silicate has a hardness binding capacity of up to 5.8 meq $Ca^{2+}$ per gram anhydrous product and up to 8.9 meq $Mg^{2+}$ per gram anhydrous product.

3. A crystalline phase sodium/potassium silicate produced by the following process:
   producing an anhydrous sodium/potassium silicate; glass having a composition of $ZSiO_2:(xNa_2O+yK_2O)$ where $1.7<Z<3.22$, $1>x>0.75$, $0<y<0.25$, and $x+y=1$;
   dissolving said glass in water to produce a liquid sodium/potassium silicate;
   spray drying said liquid sodium/potassium silicate to produce a hydrous sodium/potassium polysilicate; and
   calcining said hydrous sodium/potassium polysilicate for at least about fifteen minutes at a temperature between about 500° C. and about 800° C. to produce a crystalline silicate.

4. The crystalline phase sodium/potassium silicate of claim 3 wherein said silicate has a hardness binding capacity of up to 5.9 meq $Ca^{2+}$ per gram anhydrous product and up to 8.5 meq $Mg^{2+}$ per gram anhydrous product.

5. A crystalline phase sodium/potassium silicate produced by the following process:
   producing an anhydrous amorphous sodium silicate glass having a composition of $ZSiO_2:Na_2O$ where $1.7<Z<3.22$;
   mixing said glass with a potassium hydroxide and water solution to form a mixture; and
   calcining said mixture at a temperature between about 500° C. and about 800° C. for at least about fifteen minutes to produce a crystalline silicate.

6. The crystalline phase sodium/potassium silicate of claim 5 wherein said silicate has a hardness binding capacity of up to 6.1 meq $Ca^{2+}$ per gram anhydrous product and up to 9.0 meq $Mg^{2+}$ per gram anhydrous product.

7. A detergent builder comprising a crystalline DB-1 phase sodium/potassium silicate having a composition of $ZSiO_2$; $(xNa_2O+yK_2O)$ where $1.7<Z<3.22$, $1>x>0.75$, $0<y<0.25$, and $x+y=1$, and having an x-ray diffraction pattern having d-spacings of 6.9429 Å, 6.0315 Å, 4.9072 Å, 4.2037 Å, 3.9878 Å, 3.7906 Å, 3.6268 Å, 3.4603 Å, 3.8964 Å, 2.9097 Å, 2.7637 Å, 2.5673 Å, 2.5000 Å, and 2.4227 Å.

8. The detergent builder of claim 7 wherein said crystalline phase sodium/potassium silicate has a composition of $ZSiO_2:(xNa_2O+yK_2O)$ where $1.7\leq Z\leq 3.22$, $1>x>0.75$, $0<y<0.25$, and $x+y=1$.

9. The detergent builder of claim 8 wherein said crystalline phase sodium/potassium silicate has a hardness binding capacity of up to 6.1 meq $Ca^{2+}$ per gram anhydrous product and up to 9.0 meq $Mg^{2+}$ per gram anhydrous product.

10. A cleaning composition containing a surfactant and a builder wherein said builder comprises a DB-1 crystalline phase sodium/potassium silicate having a composition of $ZSiO_2:(xNa_2O+yK_2O)$ where $1.7<Z<3.22$, $1>x>0.75$, $0<y<0.25$, and $x+y=1$, and having an x-ray diffraction pattern having d-spacings of 6.9429 Å, 6.0315 Å, 4.9072 Å, 4.2037 Å, 3.9878 Å, 3.7906 Å, 3.6268 Å, 3.4603 Å, 3.8964 Å, 2.9097 Å, 2.7637 Å, 2.5673 Å, 2.5000 Å, and 2.4227 Å.

11. The cleaning composition of claim 10 further including 5% to 95% by weight of a co-builder.

12. The cleaning composition of claim 11, wherein said co-builder is a zeolite.

13. The cleaning composition of claim 10 wherein said DB-1 crystalline phase sodium/potassium silicate has a hardness binding capacity of up to 6.1 meq $Ca^{2+}$ per gram anhydrous product and up to 9.0 meq $Mg^{2+}$ per gram anhydrous product.

14. A cleaning composition containing a surfactant and a builder wherein said builder comprises a DB-1 crystalline phase sodium/potassium silicate which is the product of the following process:
   producing an anhydrous sodium/potassium glass having a composition of $ZSiO_2:(xNa_2O+yK_2O)$ where $1.7<Z<3.22$, $1>x>0.75$, $0<y<0.25$, and $x+y=1$; and
   calcining said glass at a temperature between about 500° C. and about 800° C. for at least about fifteen minutes to produce a crystalline silicate.

15. The cleaning composition of claim 14 wherein said DB-1 crystalline phase sodium/potassium silicate has a hardness binding capacity of up to 5.8 meq $Ca^{2+}$ per gram anhydrous product and up to 8.9 meq $Mg^{2+}$ per gram anhydrous product.

16. A cleaning composition containing a surfactant and a builder wherein said builder comprises a DB-1 crystalline phase sodium/potassium silicate which is the product of the following process:
   producing an anhydrous sodium/potassium silicate glass having a composition of $ZSiO_2:(xNa_2O+yK_2O)$ where $1.7<Z<3.22$, $1>x>0.75$, $0<y<0.25$, and $x+y=1$;
   dissolving said glass in water to produce a liquid sodium/potassium silicate;
   spray drying said liquid sodium/potassium silicate to produce a hydrous sodium/potassium polysilicate; and
   calcining said hydrous sodium/potassium polysilicate for at least about fifteen minutes at a temperature between about 500° C. and about 800° C. to produce a crystalline silicate.

17. The cleaning composition of claim 16 wherein said DB-1 crystalline phase sodium/potassium silicate has a hardness binding capacity of up to 5.9 meq $Ca^{2+}$ per gram anhydrous product and up to 8.5 meq $Mg^{2+}$ per gram anhydrous product.

18. A cleaning composition containing a surfactant and a builder wherein said builder comprises a DB-1 crystalline phase sodium/potassium silicate which is the product of the following process:
   producing an anhydrous amorphous sodium silicate glass having a composition of $ZSiO_2:Na_2O$ where $1.7\leq Z\leq 3.22$;
   mixing said glass with a potassium hydroxide and water solution to form a mixture; and
   calcining said mixture at a temperature between about 500° C. and about 800° C. for at least about fifteen minutes to produce a crystalline silicate.

19. The cleaning composition of claim 18 wherein said DB-1 crystalline phase sodium/potassium silicate has a hardness binding capacity of up to 6.1 meq $Ca^{2+}$ per gram anhydrous product and up to 9.0 meq $Mg^{2+}$ per gram anhydrous product.

20. A composition consisting essentially of a crystalline DB-1 phase sodium/potassium silicate having a composition of $ZSiO_2:(xNa_2O+yK_2O)$ where $1.7<Z<3.22$, $1>x>0.75$, $0<y<0.25$, and $x+y=1$ and having D-spacings of 6.9429 Å, 6.0315 Å, 4.9072 Å, 4.2037 Å, 3.9878 Å, 3.7906 Å, 3.6268 Å, 3.4603 Å, 3.8964 Å, 2.9097 Å, 2.7637 Å, 2.5673 Å 2.5000 Å, and 2.4227 Å.

* * * * *

UNITED STATES PATENT AND TRADE MARK OFFICE
CERTIFICATE OF CORRECTION

PATENT NO. : 5,739,098
DATED : April 14, 1998
INVENTOR(S) : Denkewicz, Jr. et al.

It is certified that error appears in the above-identified patent and that said Letters Patent is hereby corrected as shown below:

At column 19, line 52, delete "$1.7 < Z < 3.22$" and insert therefor --$1.7 \leq Z \leq 3.22$--

At column 19, line 65, delete "$1.7 < Z < 3.22$" and insert therefor --$1.7 \leq Z \leq 3.22$--

At column 20, line 15, delete "$1.7 < Z < 3.22$" and insert therefor --$1.7 \leq Z \leq 3.22$--

At column 20, line 28, delete "$1.7 < Z < 3.22$" and insert therefor --$1.7 \leq Z \leq 3.22$--

At column 20, line 44, delete "$1.7 < Z < 3.22$" and insert therefor --$1.7 \leq Z \leq 3.22$--

At column 20, line 64, delete "$1.7 < Z < 3.22$" and insert therefor --$1.7 \leq Z \leq 3.22$--

At column 21, line 12, delete "$1.7 < Z < 3.22$" and insert therefor --$1.7 \leq Z \leq 3.22$--

At column 22, line 20, delete "$1.7 < Z < 3.22$" and insert therefor --$1.7 \leq Z \leq 3.22$--

In the abstract, at line 2, delete "matrix. Wherein" and insert --matrix wherein--.

Signed and Sealed this

Twenty-sixth Day of January, 1999

Attest:

*Attesting Officer*

*Acting Commissioner of Patents and Trademarks*